(12) United States Patent
Waters et al.

(10) Patent No.: US 7,555,616 B2
(45) Date of Patent: Jun. 30, 2009

(54) DEVICES AND METHODS FOR MEMORY TAG ERROR CORRECTION

(75) Inventors: John Deryk Waters, Bath (GB); Weng Wah Loh, Filton (GB); Fraser John Dickin, Almondsbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 418 days.

(21) Appl. No.: 10/947,171

(22) Filed: Sep. 23, 2004

(65) Prior Publication Data

US 2005/0078498 A1 Apr. 14, 2005

(30) Foreign Application Priority Data

Sep. 27, 2003 (GB) ................................ 0322694.1

(51) Int. Cl.
*G06F 12/00* (2006.01)
*G06F 13/00* (2006.01)
*G06F 13/28* (2006.01)
*H04Q 5/22* (2006.01)
*G08B 13/14* (2006.01)

(52) U.S. Cl. .................... 711/154; 340/572.5; 340/10.1
(58) Field of Classification Search ................ 711/154; 365/192, 198, 226
See application file for complete search history.

(56) References Cited

U.S. PATENT DOCUMENTS

| 4,818,855 | A | | 4/1989 | Mongeon et al. |
| 5,354,975 | A | | 10/1994 | Ishibashi et al. |
| 5,414,833 | A | * | 5/1995 | Hershey et al. ............... 726/22 |
| 6,150,948 | A | * | 11/2000 | Watkins .................... 340/693.3 |
| 6,177,858 | B1 | | 1/2001 | Raimbault |

FOREIGN PATENT DOCUMENTS

| EP | 0430291 A2 * | 11/1990 |
| EP | 0 430 291 A2 | 6/1991 |
| EP | 0 559 205 A1 | 9/1993 |
| GB | 2 363 498 A | 12/2001 |

* cited by examiner

*Primary Examiner*—Hyung S Sough
*Assistant Examiner*—Gary W Cygiel

(57) ABSTRACT

Embodiments relating to a memory tag having a resonant circuit part and a non-volatile memory is presented. The resonant circuit part can be made operable, in response to a reader signal received from a reader, to provide power to the memory, the tag being operable to read the memory and transmit data stored in the memory in response to the signal from the reader. The data is stored in the memory in a plurality of data units, with each data unit having an associated sequence number. The tag is operable to store the sequence number of the data unit to be transmitted in a register in the non-volatile memory. When power is supplied to the memory, the data units are transmitted in sequence, where the first data unit to be transmitted depends on the stored sequence number.

12 Claims, 4 Drawing Sheets

DEVICES AND METHODS FOR MEMORY TAG ERROR CORRECTION

FIELD OF THE INVENTION

This invention relates to a memory tag powered by a signal generated by a reader, and a reader.

BACKGROUND OF THE INVENTION

Memory tags in the form of Radio Frequency Identification (RFID) tags are well known in the prior art, and the technology is well established (see for example: RFID Handbook, Klaus Finkenzeller, 1999, John Wiley & Sons). RFID tags come in many forms but all comprise an integrated circuit with information stored on it and a coil which enables it to be interrogated by a read/write device generally referred to as a reader. Until recently RFID tags have been quite large, due to the frequency they operate at (13.56 MHz) and the size of coil they thus require, and have had very small storage capacities. Such RFID tags have tended to be used in quite simple applications, such as for file tracking within offices or in place of or in addition to bar codes for product identification and supply chain management.

Much smaller RFID tags have also been developed, operating at various frequencies. For example Hitachi-Maxell have developed "coil-on-chip" technology in which the coil required for the inductive link is on the chip rather than attached to it. This results in a memory tag in the form of a chip of 2.5 mm square, which operates at 13.56 MHz. In addition Hitachi has developed a memory tag referred to as a "mu-chip" which is a chip of 0.4 mm square and operates at 2.45 GHz. These smaller memory tags can be used in a variety of different applications. Some are even available for the tagging of pets by implantation.

Although it is known to provide tags with their own power source, in many applications the tag is also powered by the radio frequency signal generated by the reader. Such a known system is shown in FIG. 1 where a reader is indicated generally at 10 and a tag at 12. The reader 10 comprises a radio frequency generator 13 and a resonant circuit part 11, in the present example comprising an inductor 14 and a capacitor 15 connected in parallel. The inductor 14 comprises an antenna. The resonant circuit part will have a particular resonant frequency in accordance with the capacitance and inductance of the capacitor 15 and the inductor 14, and the frequency generator 13 is operated to generate a signal at that resonant frequency.

The tag 12 similarly comprises a resonant circuit part generally illustrated at 16, a rectifying circuit part generally indicated at 17 and a memory 18. The resonant circuit part 16 comprises an inductor 19 which again comprises in this example a loop antenna, and a capacitor 20. The resonant circuit part 16 will thus have a resonant frequency set by the inductor 19 and capacitor 20. The resonant frequency of the resonant circuit part 16 is selected to be the same as that of the reader 10. The rectifying part comprises a forward-biased diode 21 and a capacitor 22 and thus effectively acts as a half-wave rectifier.

When the reader 10 and the tag 12 are sufficiently close, a signal generated by the frequency generator 13 will cause the resonant circuit part 11 to generate a reader signal comprising a high frequency electromagnetic field. When the resonant circuit part 16 is located within this field, a current will be caused to flow in the resonant circuit part 16, drawing power from the time varying magnetic field generated by the reader. The rectifying circuit part 17 will then serve to smooth the voltage across the resonant frequency part and provide a power supply storage. The rectifying circuit part 17 is sufficient to supply a sufficiently stable voltage to the memory 18 for the memory to operate.

To transmit data from the tag to the reader, the resonant circuit part is also provided with a switch 23, here comprising a field effect transistor (FET). The FET is connected to the memory by a control line 24. When the switch 23 is closed, it causes an increased current to flow in the tag resonant circuit part 16. This increase in current flow in the tag results in an increased current flow in the reader's resonant circuit part 11 which can be detected as a change in voltage drop across the reader inductor 14. Thus, by controlling the switch 23, data stored in the memory 18 of the tag 12 can be transmitted to the reader 10.

With such known tags when power is supplied to the tag, the tag transmits its stored data in a continuous loop, referred to as a "data carousel". If the data received by the reader is corrupted or erroneous in any way, the reader simply waits for the data to be retransmitted. Where the tag only holds a relatively small amount of data, such as the 128 bits held by the Hitachi-Maxell mu-chip, this does not cause any particular disadvantage. Where, however, a tag is provided with a larger memory, simply waiting for the data to be retransmitted may be excessively time consuming.

In so-called simplex transmission systems, where there is no way of communicating to the transmitting station that a packet is not being correctly received, it is known to use forward error control codes which permit even substantially corrupted data to be recovered without requiring retransmission of the data, but this adds significantly to the quantity of data to be transmitted.

Where data is transmitted as packets, it also known to provide validation information as part of the packet, a check sum or a cyclic redundancy check code so that the receiving system can check the validity of the data received, but this requires some way of asking the transmitting system to retransmit corrupted packets or, where this is not possible, again waiting for the packet to be retransmitted as part of the data carousel.

An aim of the present invention is to provide a new or improved tag and reader which reduces or overcome one or more of the above problems.

SUMMARY OF THE INVENTION

According to a first aspect of this invention we provide a memory tag comprising a resonant circuit part and a non-volatile memory, the resonant circuit part being operable, in response to a reader signal received from a reader, to provide power to the memory, the memory tag being operable to read the memory and transmit data stored in the memory in response to the signal from the reader, wherein the data is stored in the memory in a plurality of data units, each data unit having an associated sequence number, the tag being operable to store the sequence number of the data to be transmitted in a register in the non-volatile memory, and when power is supplied to the memory, the data units are transmitted in sequence, the first data unit to be transmitted depending on the stored sequence number.

The memory tag may be operable to transmit the data unit in a packet comprising validity information.

The validity information may comprise cyclic redundancy check data.

The packet may further comprise the sequence number of the data unit.

The memory tag may be operable to read the stored sequence number, read the data unit associated with the sequence number, transmit the data unit and increment the stored sequence number.

When power is supplied to the memory, the stored sequence number may be decremented and the data units may be transmitted in sequence beginning with the data unit associated with the decremented sequence number.

According to a second aspect of this invention we provide a reader for reading the memory tag, the reader being operable to transmit a reader signal to a memory tag to supply power to the memory tag, and receive a signal comprising a data unit from a memory tag, the reader further being operable to validate the data unit, and, if the data unit is not valid, vary the reader signal to vary the power supplied to the memory tag and receive a further signal comprising the data unit from the memory tag.

The data unit may be received in a packet comprising validity information, wherein the reader may be operable to validate the data unit in accordance with the validity information.

The validation information may comprise cyclic redundancy check information.

The packet may comprise a sequence number associated with the data unit and the reader may be operable to store a plurality of received data units in a sequence specified by the associated sequence numbers.

The reader may be operable to vary the reader signal to vary the power supplied to the memory tag by reducing the reader signal power such that the memory tag is supplied with insufficient power to operate and then increasing the reader signal power to supply power to the memory tag.

According to a third aspect of the invention we provide a method of operating a memory tag to transmit stored data, wherein the data comprises a plurality of data units each having an associated sequence number, the method comprising the initial step of reading a register stored in a non-volatile memory which stores a sequence number, determining a first data unit to be transmitted in accordance with the stored sequence number and transmitting the data units in sequence starting with the first data unit.

The method may further comprise repeating the steps of reading the register, reading the data unit associated with the stored sequence number and transmitting the data unit, and incrementing the sequence number stored in the register.

The initial step of determining the first data unit to be transmitted may comprise decrementing the sequence number stored in the register.

The method may comprise transmitting validation information with the data unit.

According to a fourth aspect of the invention we provide a method of operating a reader for reading a memory tag, comprising transmitting a reader signal to a memory tag to supply power to the memory tag, receiving a signal comprising a data unit from a memory tag, validating the data unit, and, if the data unit is not valid, varying the reader signal to vary the power supplied to the memory tag and receiving a further signal comprising the data unit from the memory tag.

BRIEF DESCRIPTION OF THE DRAWINGS

An embodiment of the present invention will now be described by way of example only with reference to the accompanying drawings, wherein.

DETAILED DESCRIPTION OF THE PREFERRED EMBODIMENTS

Figure 1:
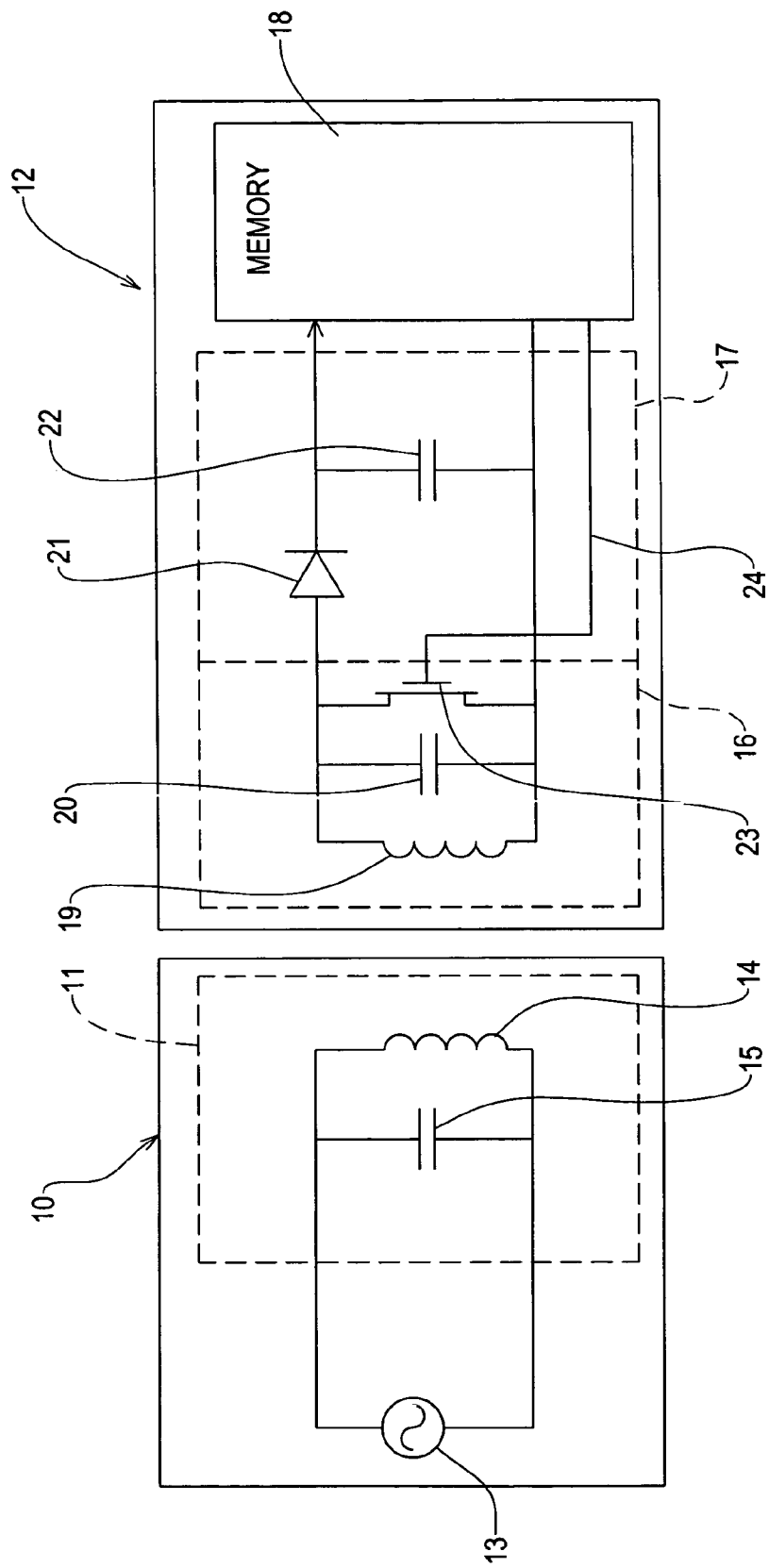
FIG. 1 is a schematic circuit diagram of a tag and reader of known type.
Figure 2:
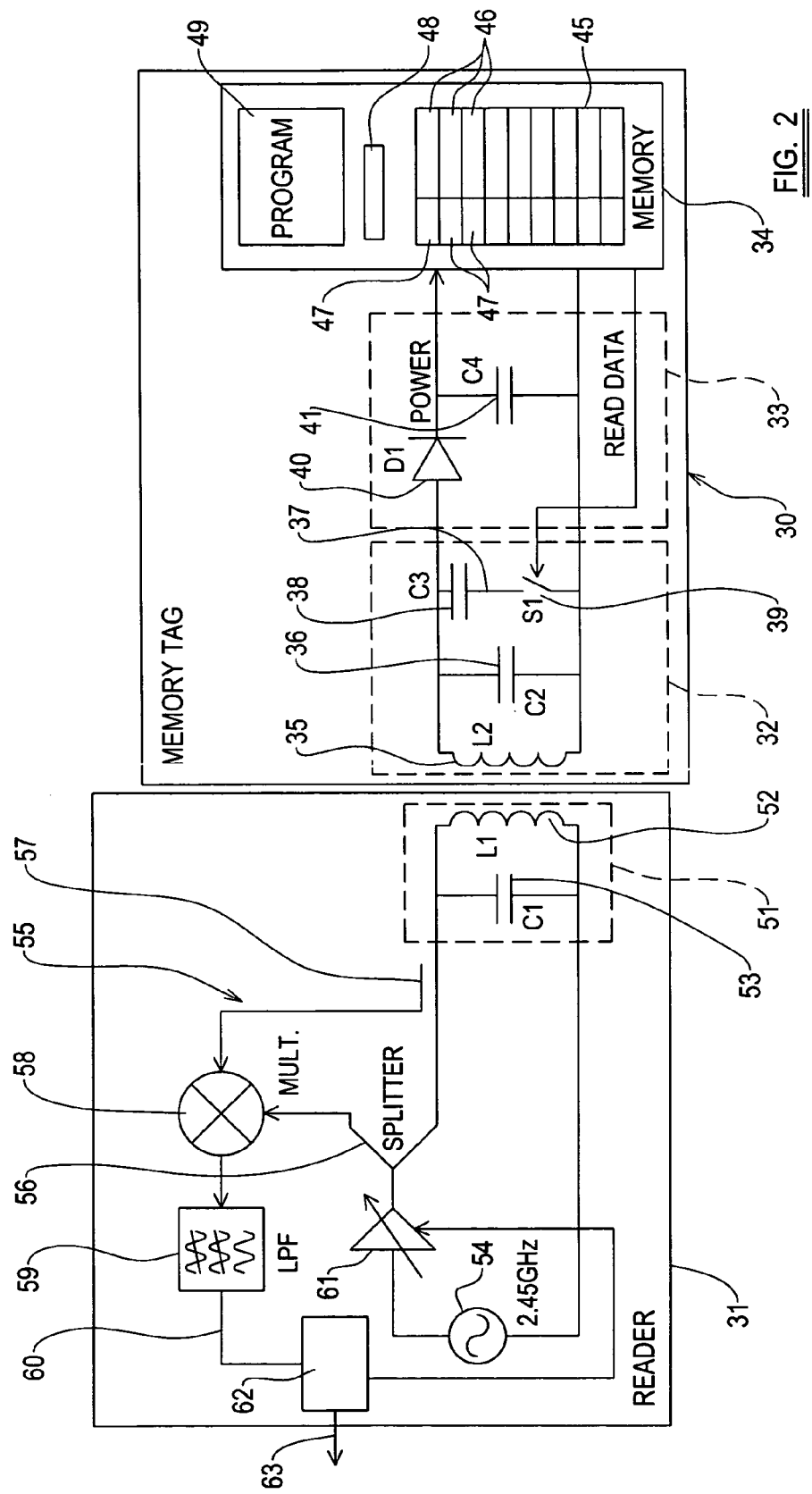
FIG. 2 is a schematic circuit diagram for a memory tag and a reader embodying the present invention.

Referring now to FIG. 2, a memory tag embodying the present invention is shown at 30 and a reader shown at 31. The tag 30 comprises a resonant circuit part 32 and a rectifying circuit part 33, together with a non-volatile memory 34. The resonant circuit part 32 comprises an inductor L2 shown at 35 and a capacitor C2 shown at 36 connected in parallel in like manner to the tag 12 of FIG. 1. The resonant circuit part 32 further comprises a controllable capacitive element generally indicated at 37, in the example of FIG. 2 comprising a capacitor C3 shown at 38 and a switch S1 shown at 39. The rectifying circuit part 33 comprises a diode D1 shown at 40 connected to the resonant circuit part 32 in a forward biased direction and a capacitor C4 shown at 41 connected in parallel with the components of the resonant circuit part 32. The rectifying circuit part 33 operates in like manner to the rectifying circuit part 17 of FIG. 1 as a half-wave rectifier to provide power to the memory 34.

The memory 34 comprises a data store generally illustrated at 45 comprising a plurality of data units 46, each of which has an associated sequence number generally illustrated at 47. The memory 34 further has a sequence number register 48 and an operating program 49 which is run when the tag 30 receives sufficient power via a reader signal from the reader 31.

The reader 31 comprises a resonant circuit part 51 which comprises an inductor L1 shown at 52, in this example an antenna and a capacitor C1 shown at 53 connected in parallel. A signal generator 54 is connected to the resonant circuit part 51 to provide a drive signal.

The reader 31 further comprises a demodulator, generally shown at 55. The demodulator 55 comprises a splitter 56 connected to the frequency generator to split off a part of the drive signal to provide a reference signal. A coupler 57 is provided to split off part of a reflected signal reflected back from the resonant circuit part 51, and pass the reflected signal to a multiplier shown at 58. The multiplier 58 multiplies the reflected signal received from the coupler 57 and the reference signal received from the splitter 56 and passes the output to a low pass filter 59. The low pass filter 59 passes a signal corresponding to the phase difference between the reference signal and the reflected signal to an output 60. An amplitude modulator is shown at 61 operable to control the amplitude of the drive signal supplied from the frequency generator 54 to the resonant circuit part 51.

A control unit 62 is operable to receive the output 60 from the low pass filter 59 and validate the received data. The control unit 62 is also operable to control the amplitude modulator 61.

In the embodiment shown in FIG. 2, a signal comprising a data unit is transmitted to the reader 31 by operating switch S1 shown at 39. This varies the resonant frequency of the resonant circuit part 32. This change in resonant frequency causes the phase of the signal reflected from the resonant circuit part 51 to vary with respect to the signal provided by the signal generator 54. This relative phase shift can be processed by the multiplexer 58 and low pass filter 59 to produce a digital output 63 as described in our earlier co-pending application, (C19350).

Figure 3:
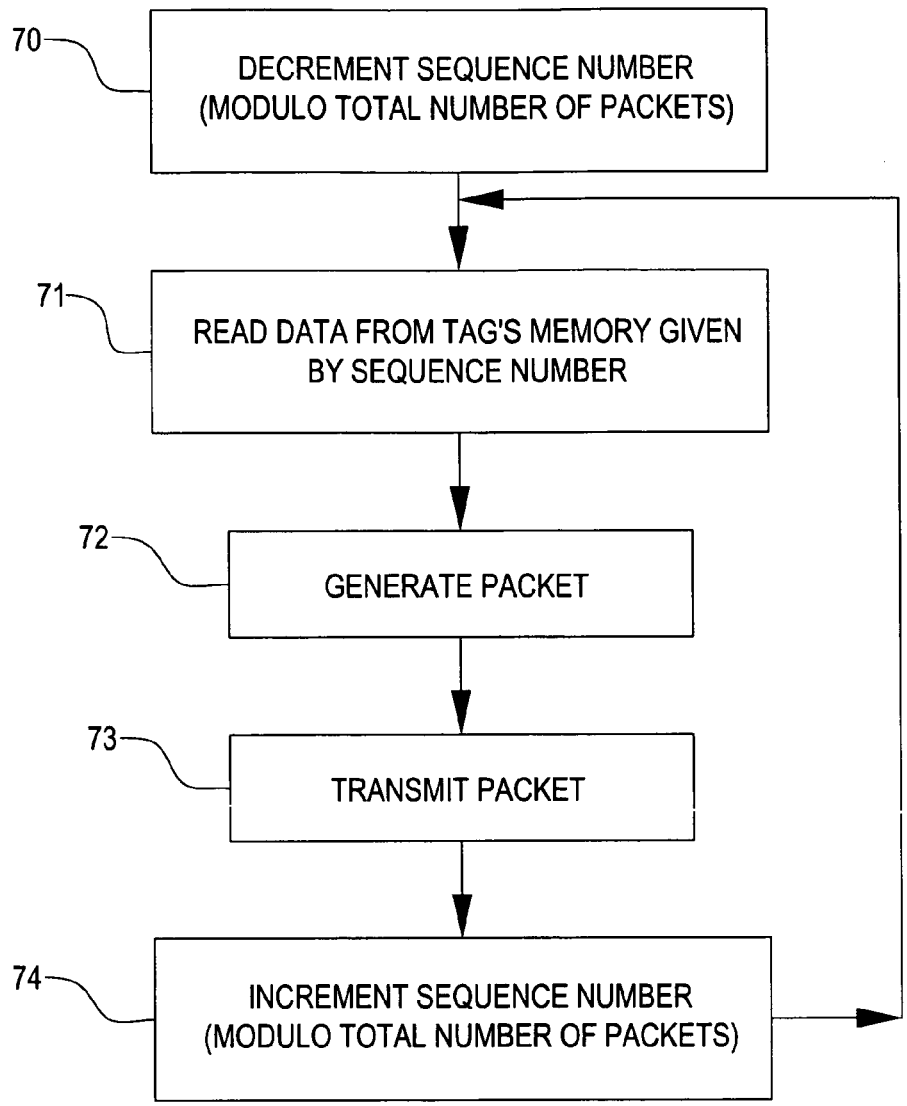
FIG. 3 is method of operation of the memory tag of FIG. 2.
Figure 4:
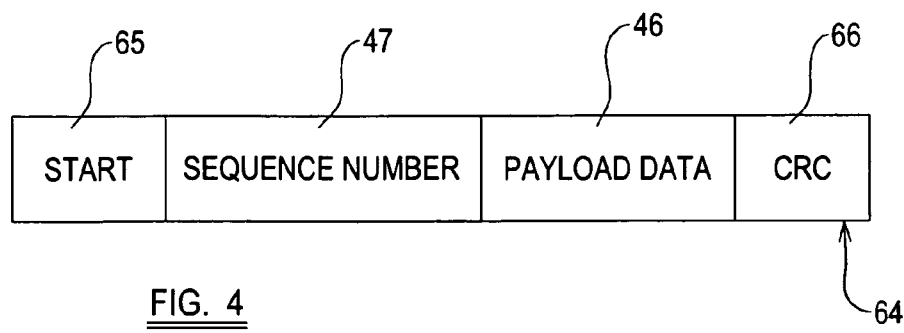
FIG. 4 is an illustration of a structure of a data packet transmitted by the memory tag in FIG. 2.

The memory tag 30 operates as follows with reference to FIGS. 3 and 4. When the tag 30 is moved sufficiently close to a reader 31 so that inductive coupling can be established between the resonant circuit parts 51, 32, power will be supplied to the memory 34 to run the program 49. The program 49, as shown at step 70 of FIG. 3, will read the sequence number stored in sequence number register 48 and subtract one from that value, modulo the total number of packets. At step 71, the data unit 46 identified by the sequence number 47 stored in the register 48 will be read from the data store 45 and transmitted as a part of a packet by operation of switch S1. A packet is generally illustrated at 64 in FIG. 4 and comprises a start indicator 65, the sequence number 47, the data unit 46 and validation information 66. In the present example the validation information 66 comprises a cyclic redundancy check of known type, which may preferably be simply generated when the data unit 46 is read from the data store 45. Alternatively, it might be envisaged that each data unit 46 be stored with its associated cyclic redundancy check, although it would use a potentially undesirable portion of the storage space available in the memory 34. It will be apparent that the validation data may be any other information as required, such as a check sum or other validation information.

At step 72, the packet 64 is generated, and at step 73 transmitted to the reader 31. The program 49 then increments the sequence number stored in the sequence number register 48 by one at step 74 and then the method repeats from step 71. It will be apparent, that if the program 49 is not interrupted, it will continually cycle through the stored data units 46 in the order specified by the sequence numbers 47.

The transmitted packet is received by the reader 31 and the resulting output 60 is passed to the validation module 62 which performs a validation check on the received packet 64 using the validation information 66. In the case where the validation information 66 comprises a cyclic redundancy check, this is performed by dividing the value of the packet 64 by the predefined polynomial used to generate the CRC validation information 66. If the remainder is zero, the packet is valid and is passed to output 63. If the remainder is non-zero, there is an error in the packet and the packet should be discarded.

If there is an error in the packet, i.e. it is not valid, the validation module 62 is then operable to control the amplitude modulator 61 to reduce the amplitude of the reader signal sufficiently so that insufficient power is received by the tag 30 to power the memory 34. The validation module 62 then adjusts the amplitude modulator 61 to return the power in the reader signal to its previous level. Sufficient power will then be passed by the rectifier 33 to the memory 34 for it to be powered, whereupon the program 49 will commence from step 70 at FIG. 3. The sequence number corresponding to the corrupt or invalid packet 70 will be held in the sequence number register 48 in the non-volatile memory 34. At step 70, the program 49 will thus decrement this value by one and then at steps 71 to 73 generate a further signal comprising the data unit. The program 79 reads the data unit corresponding to the previous packet transmitted and sends it. The program 49 then repeats the steps 71 to 74 again to resend the data unit which was not received correctly and then succeeding packets.

In this manner, when an invalid packet is received from the memory tag 30 it is not necessary to wait for the data carousel to return to the invalid packet in due course, nor is it necessary to transmit a specific request to the memory tag 30. By dropping the power supply to the memory tag 30 and then raising it again, the memory tag 30 is in effect caused to start retransmitting data from that prior to the erroneous packet. Of course, the reader signal may be varied in any other way as desired. For example, by varying the frequency of the reader signal the strength of the resonant coupling between the reader and memory tag falls and so reduces the transfer of power to the memory tag.

The validation module 62 or some other module may then be operable to generate a complete, sequential set of data units 46 by discarding packets which are received more than once and assembling the packets in order according to the sequence numbers 47.

It will be apparent that the program 49 need not decrement the stored sequence number on power up, so that it starts transmitting the packet which was not validly received, or indeed may begin retransmission from earlier in the sequence by decrementing the stored sequence number by two or more.

Figure 5:
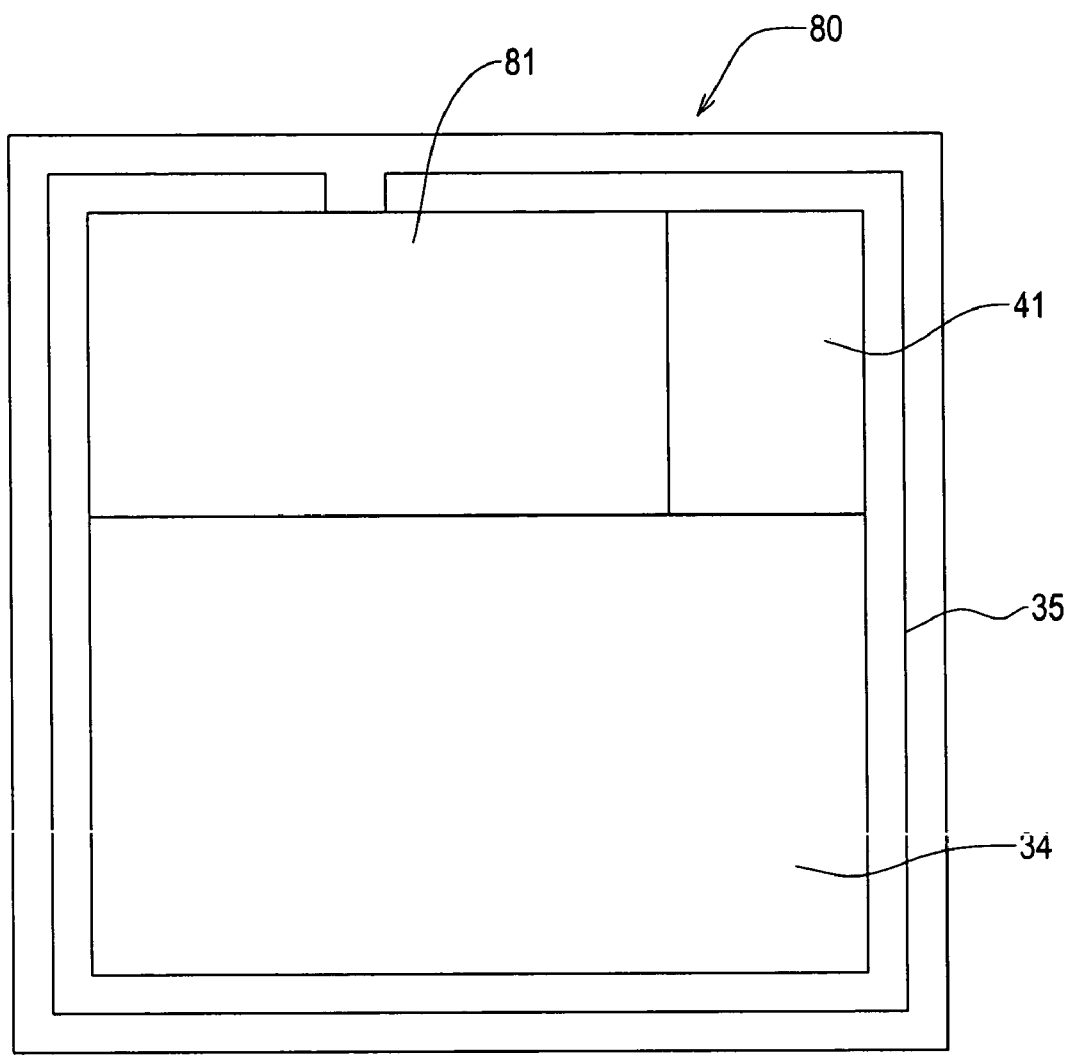
FIG. 5 is a schematic view of an RFID memory tag embodied in the present invention.

In a preferred embodiment, the resonant frequency of the resonant circuit parts 32, 51 and hence the frequency of the signal generated by the frequency source 45 is about 2.45 GHz, and the resonant frequency of the resonant circuit part 32 is modulated by about 0.05 GHz either side of this reference frequency. At this frequency, component values for the inductors and the capacitors are small, allowing easy integration of the circuit and require relatively small areas of silicon on an integrated circuit. It is particularly desirable that the tag 30 be provided as an integrated circuit, for example as a CMOS integrated circuit. A schematic of such an integrated circuit is show at 80 in FIG. 5. The inductor L2 is shown at 35, here as an antenna coil having only a single turn although any number of turns may be provided as appropriate. The capacitor C4 is shown at 41, and the remaining components of the resonant circuit part and rectifying circuit part 33 are shown at block 81. The memory is shown at 34. The memory 34 provides 1 Mbit of capacity of non-volatile memory and is of an area of approximately 1 mm$^2$, and uses FRAM (ferroelectric random access memory) or MRAM (magnetoresistive random access memory) or similar memory technology requiring low power. The memory tag 30 is of a substantially square shape in plan view with an external dimension D for the sides of around 1 mm.

It will be apparent that the present invention may be used with any type of memory tag 30 and reader 31 other than those disclosed herein.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A memory tag comprising a resonant circuit part and a non-volatile memory,
   the resonant circuit part being operable, in response to a reader signal received from a reader, to provide power to the memory,
   the tag being operable to read the memory and transmit data stored in the memory in response to the signal from the reader,
   wherein the data is stored in the memory in a plurality of data units, each data unit having an associated sequence number, the tag being operable to store the sequence number of the data unit to be transmitted in a register in the non-volatile memory, when power is supplied to the memory, the data units are transmitted in a first incremental sequence, the first data unit to be transmitted depending on the stored sequence number, and wherein, when power is initially supplied to the memory, the stored sequence number is decremented and thereafter the data units are transmitted in the first sequence until power is removed from the memory, such that at least one data unit that was previously transmitted is retransmitted.

2. A memory tag according to claim 1 operable to transmit the data unit in a packet comprising validity information.

3. A memory tag according to claim 2 wherein the validity information comprises cyclic redundancy check data.

4. A memory tag according to claim 2 wherein the packet further comprises the sequence number of the data unit.

5. A memory tag according to claim 1 operable to read the stored sequence number, read the data unit associated with the stored sequence number, transmit the data unit and increment the stored sequence number.

6. A method of operating a memory tag to transmit stored data, wherein the data comprises a plurality of data units each having an associated sequence number, the method comprising the steps of determining a first data unit to be transmitted in accordance with a stored sequence number and transmitting the data units in incremental sequence beginning with the first data unit; and when power is removed and re-supplied to the memory tag, again determining a data unit by retrieving the stored sequence number and decrementing it.

7. A method according to claim 6 further comprising repeating the steps of;

reading a register, reading the data unit associated with the stored sequence number and transmitting the data unit, and incrementing the sequence number stored in the register.

8. A method according to claim 6 wherein the step of retrieving the stored sequence number and decrementing it comprises decrementing the sequence number stored in the register.

9. A method according to claim 8 comprising transmitting validation information with the data unit.

10. A memory tag comprising a resonant circuit part and a non-volatile memory, the resonant circuit part being operable, in response to a reader signal received from a reader, to provide power to the memory, the tag being operable to read the memory and transmit data stored in the memory in response to the signal from the reader, wherein the data is stored in the memory in a plurality of data units, each data unit having an associated sequence number, the memory tag being operable to store the sequence number of the data unit to be transmitted in a register in the non-volatile memory, and when power is initially supplied to the memory, the memory tag is operable to;

decrementing the sequence number stored in a non-volatile memory of the memory tag to produce a changed sequence number, determine a first data unit to be transmitted in accordance with the changed sequence number, read the first data unit and transmit the first data unit, and repeat steps of:

reading the stored sequence number, reading the data unit associated with the stored sequence number and transmitting the data unit, and incrementing the stored sequence number in the register.

11. A memory tag comprising a resonant circuit part and a non-volatile memory, the resonant circuit part being operable, in response to a reader signal received from a reader, to provide power to the memory, the tag being operable to read the memory and transmit data stored in the memory in response to the signal from the reader, wherein the data is stored in the memory in a plurality of data units, each data unit having an associated sequence number, the memory tag being operable to store the sequence number of the data unit to be transmitted in a register in the non-volatile memory, and when power is supplied to the memory, the memory tag is operable to;

read a register stored in a non-volatile memory of the memory tag which stores a sequence number, decrement the stored sequence number, read the data unit associated with the stored sequence number, transmit the data unit and increment the stored sequence number.

12. A memory tag according to claim 11 operable to repeat the steps of;

reading the register to read the stored sequence number, reading the data unit associated with the stored sequence number and transmitting the data unit, and incrementing the sequence number stored in the register.

* * * * *